United States Patent
Matsuda

(10) Patent No.: US 9,768,661 B2
(45) Date of Patent: Sep. 19, 2017

(54) SADDLE-TYPE VEHICLE

(75) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 741 days.

(21) Appl. No.: 13/988,322

(22) PCT Filed: Nov. 18, 2010

(86) PCT No.: PCT/JP2010/006768
§ 371 (c)(1),
(2), (4) Date: Jun. 19, 2013

(87) PCT Pub. No.: WO2012/066602
PCT Pub. Date: May 24, 2012

(65) Prior Publication Data
US 2013/0270940 A1    Oct. 17, 2013

(51) Int. Cl.
*H02K 5/18*    (2006.01)
*B62K 11/04*   (2006.01)
(Continued)

(52) U.S. Cl.
CPC .............. *H02K 5/18* (2013.01); *B62K 11/04* (2013.01); *B62K 11/06* (2013.01); *B62M 7/04* (2013.01);
(Continued)

(58) Field of Classification Search
CPC .. H02K 5/18; B62K 2204/00; B62K 2208/00; B62K 11/04; B62K 11/06; B62M 7/04
(Continued)

(56) References Cited

U.S. PATENT DOCUMENTS

| 6,355,995 B1* | 3/2002 | Jeppesen | H02K 9/12 310/52 |
| 2006/0012253 A1* | 1/2006 | Vasilescu | H02K 5/20 310/58 |

(Continued)

FOREIGN PATENT DOCUMENTS

| JP | 6084391 U | 6/1985 |
| JP | 363064 U | 6/1991 |

(Continued)

OTHER PUBLICATIONS

State Intellectual Property Office of the People's Republic of China, Office Action and Search Report Issued in Chinese Patent Application No. 201080070021.0, Mar. 23, 2015, 11 pages. (Submitted with translation of Search Report).

(Continued)

*Primary Examiner* — John K Kim
(74) *Attorney, Agent, or Firm* — Alleman Hall Creasman & Tuttle LLP

(57) ABSTRACT

An electric two-wheeled vehicle includes a case, an electric component accommodated in the case and having an electric part producing heat during operation, and a traveling wind guide body for cooling the electric component by traveling wind, and the traveling wind guide body has a traveling wind inlet taking in traveling wind from front, a traveling wind path through which the traveling wind taken in by the traveling wind inlet flows, and a traveling wind outlet ejecting the traveling wind flowing through the traveling wind path toward a radiation fin of the case.

17 Claims, 7 Drawing Sheets

(51) Int. Cl.
  *B62K 11/06* (2006.01)
  *B62M 7/04* (2006.01)
(52) U.S. Cl.
  CPC ...... *B62K 2204/00* (2013.01); *B62K 2208/00* (2013.01)
(58) Field of Classification Search
  USPC ..... 310/64, 67 A, 75 C; 180/65.1, 68.1, 218, 180/219, 229; 280/274, 281.1
  IPC ....................................................... H02K 5/18
  See application file for complete search history.

(56) References Cited

U.S. PATENT DOCUMENTS

| | | | | |
|---|---|---|---|---|
| 2006/0251946 | A1* | 11/2006 | Makuta | H01M 8/2475 429/470 |
| 2006/0258540 | A1* | 11/2006 | Yanagisawa | H02K 5/225 505/193 |
| 2007/0029885 | A1* | 2/2007 | Sakakibara | H02K 5/20 310/58 |
| 2008/0093148 | A1* | 4/2008 | Takahashi | B60L 11/1881 180/220 |
| 2009/0058374 | A1* | 3/2009 | Evans | H02P 9/48 322/28 |
| 2010/0163326 | A1* | 7/2010 | Takamura | B60K 1/04 180/68.5 |
| 2010/0243349 | A1* | 9/2010 | Nomura | B60K 6/40 180/65.22 |
| 2010/0270976 | A1* | 10/2010 | Tamura | B60L 11/14 320/136 |
| 2011/0139531 | A1* | 6/2011 | Kanno | B60L 3/0023 180/220 |
| 2013/0270940 | A1* | 10/2013 | Matsuda | B62K 11/04 310/64 |

FOREIGN PATENT DOCUMENTS

| | | |
|---|---|---|
| JP | 04024185 A | 1/1992 |
| JP | 05105178 A | 4/1993 |
| JP | 07117765 A | 5/1995 |
| JP | 10297570 A | 11/1998 |
| JP | 2001351653 A | 12/2001 |

OTHER PUBLICATIONS

ISA Japan, International Search Report of PCT/JP2010/006768, Feb. 16, 2011, WIPO, 2 pages.

* cited by examiner

SADDLE-TYPE VEHICLE

TECHNICAL FIELD

The present invention relates to a saddle-type vehicle such as an electric two-wheeled vehicle including an electric component having electric parts producing heat during operation.

BACKGROUND ART

Recently, electric vehicles employing motors driven by electric energy stored in batteries as traveling power sources have been developed for the purpose of environmental protection or the like. In such vehicles, a configuration of arranging a motor case to be exposed outside and cooling a motor, or a configuration of cooling a motor by air introduced by a cooling fan is proposed (e.g., see Patent Document 1).

PRIOR ART DOCUMENTS

Patent Documents

Patent Document 1: Japanese Patent Application Laid-open No. H05-105178

SUMMARY OF THE INVENTION

Problems to be Solved by the Invention

However, exposure of the motor case outside may not achieve sufficient cooling performance when the motor is overheated. When the motor is cooled by the cooling fan, the number of components increases and power for driving the cooling fan is needed.

An object of the present invention is to enable effective cooling of the electric component with a simple configuration.

Solutions to the Problems

In order to solve the aforementioned problems, a saddle-type vehicle according to the present invention includes an electric component having an electric part producing heat during operation, and a traveling wind guide body for cooling the electric component by traveling wind, wherein the traveling wind guide body has a traveling wind inlet taking in traveling wind from the front, traveling wind path through which the traveling wind taken in by the traveling wind inlet flows, and traveling wind ejecting the traveling wind flowing through the traveling wind path in order to cool the electric component, and a flow path sectional area of the traveling wind outlet is smaller than that of the traveling wind inlet.

According to the aforementioned configuration, during vehicle traveling, traveling wind is taken in from the traveling wind inlet into the traveling wind path inside the traveling wind guide body, and the traveling wind flowing through the traveling wind path increases speed to be ejected from the traveling wind outlet in order to cool the electric component. Consequently, the traveling wind increased in speed by the traveling wind outlet cools the case of the electric component. Accordingly, the electric component can be effectively cooled without a cooling fan or the like.

The electric component may be accommodated in a case, the case may have a radiation fin, and the traveling wind outlet may eject the traveling wind flowing through the traveling wind path toward the radiation fin.

According to the aforementioned configuration, a heat dissipation area of the case of the electric component is increased by the radiation fin, and the traveling wind increased in speed by the traveling wind outlet cools the radiation fin, and therefore cooling effects can be synergistically enhanced.

The saddle-type vehicle may be an electric vehicle, and the electric component may include at least one of a motor generating traveling power transmitted to a drive wheel, a battery supplying electric power to the motor, and an inverter interposed between the battery and the motor.

According to the aforementioned configuration, at least one of the motor, the battery and the inverter as the electric components producing large heat values in the electric vehicle can be simply and effectively cooled.

The saddle-type vehicle may include a valve capable of opening/closing the traveling wind path, a valve actuator driving the valve, a detector for detecting a parameter value associated with output of the motor, and a controller controlling the valve actuator according to the parameter value detected by the detector.

According to the aforementioned configuration, a flow amount of the traveling wind ejected from the traveling wind outlet is controlled according to the output of the motor by controlling the valve opening degree according to the parameter value associated with the output of the motor, and therefore at least one of the motor, the battery, and the inverter can be suitably cooled according to an operating status, and a temperature can be previously suitably kept before excessively increasing.

The detector may be a current sensor detecting a value of a current flowing through a coil of the motor, a vehicle speed sensor detecting vehicle traveling speed, or an accelerator operation-amount sensor detecting an accelerator operation-amount by a driver.

According to the aforementioned configuration, a cooling degree of at least one of the motor, the battery and the inverter can be easily controlled according to the output of the motor while having a simple configuration.

In a case where the parameter value is such a value that output of the motor increases, the controller may control the valve actuator such that an opening degree of the valve becomes larger compared to a case where the parameter value is such a value that the output of the motor reduces.

According to the aforementioned configuration, when a heat value of at least one of the motor, the battery and the inverter increases, the opening degree of the valve increases and a flow rate of the traveling wind ejected from the traveling wind outlet increases, and therefore cooling performance in a case of a large heat value can be enhanced.

The saddle-type vehicle may be an electric two-wheeled vehicle, and include a body frame having a head pipe supporting a steering shaft, and a frame portion extending substantially rearward from the head pipe, and the traveling wind guide body may form a part of the frame portion and extend such that a rear part is at a lower position.

According to the aforementioned configuration, the traveling wind guide body forms a part of the body frame, and functions like a main frame of a conventional motorcycle, and therefore an increase of size of a whole vehicle can be suppressed.

Effects of the Invention

As seen in the aforementioned description, according to the present invention, the electric component can be effectively cooled with a simple configuration.

EMBODIMENTS OF THE INVENTION

Hereinafter, embodiments according to the present invention will be described with reference to the drawings. A concept of a direction used in the following description is based on a direction viewed from a driver riding an electric two-wheeled vehicle. The present invention is applied to an electric two-wheeled vehicle in the present embodiment, but applicable to other saddle-type vehicles driven while being straddled by a driver, such as an ATV (All Terrain Vehicle).

First Embodiment

Figure 1:
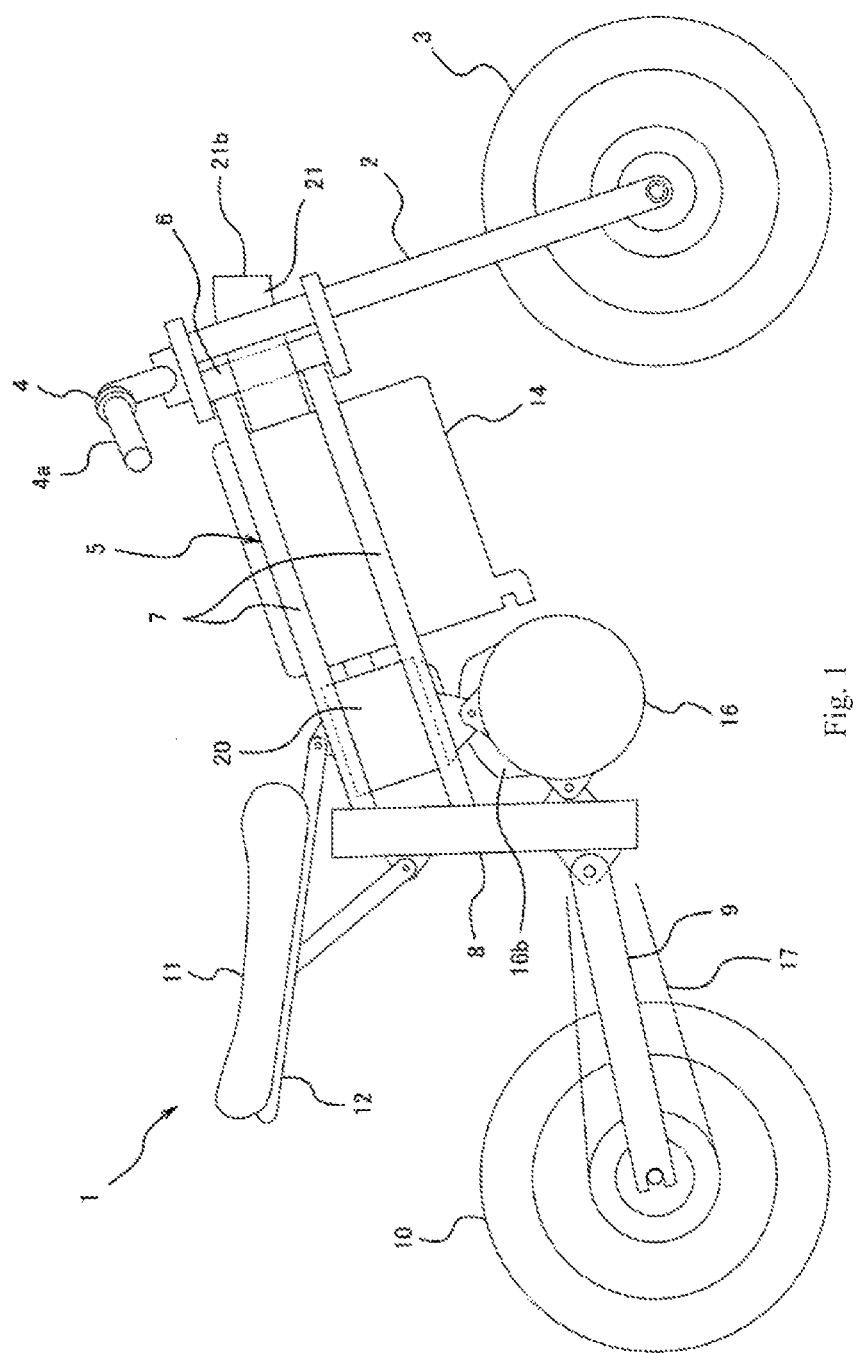
FIG. 1 is a right side view of an electric two-wheeled vehicle according to a first embodiment of the present invention.

FIG. 1 is a right side view of an electric two-wheeled vehicle 1 according to a first embodiment of the present invention. As shown in FIG. 1, the electric two-wheeled vehicle 1 includes no internal-combustion engine, and travels by rotating a rear wheel 10 with power from a motor 15. The electric two-wheeled vehicle 1 includes a front fork 2 provided substantially vertically at a predetermined caster angle, and a front wheel 3 as a driven wheel is rotatably supported on a lower portion of the front fork 2. A steering shaft (not shown) has a lower portion connected to an upper portion of the front fork 2, and an upper portion mounted with a bar-type handle 4. An accelerator grip 4a in the handle 4 is provided on a portion gripped by a right hand of a driver. The steering shaft (not shown) is rotatably inserted into a head pipe 6 configuring a body frame 5, and the driver steers the front wheel 3 by rotating the handle 4.

The body frame 5 includes the head pipe 6, and a pair of right and left and a pair of upper and lower main frames 7 extending rearward while inclining downward from the head pipe 6. Rear portions of the main frames 7 are connected to a pair of right and left pivot frames 8. A front portion of a swing arm 9 extending in a substantially forward and rearward direction pivots on the pivot frames 8, and a rear wheel 10 as a drive wheel is rotatably supported on a rear portion of the swing arm 9. A rear suspension (not shown) is spanned between an intermediate portion of the swing arm 9 and the pivot frames 8. A seat frame 12 supporting a seat 11 for a driver's riding is connected to the main frames 7 and the pivot frames 8.

Figure 2:
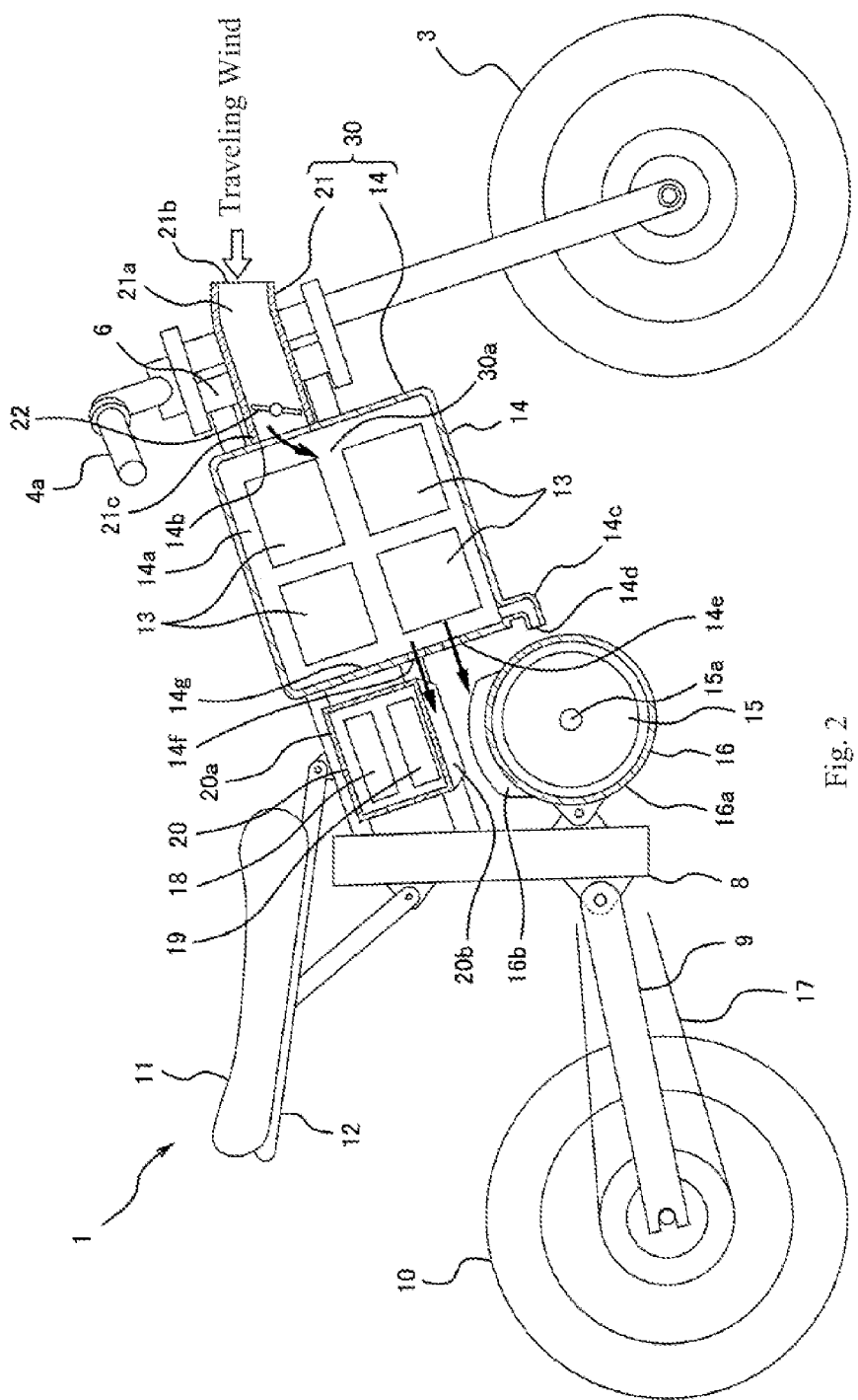
FIG. 2 is a right side view including a part of the electric two-wheeled vehicle shown in FIG. 1 in section.

FIG. 2 is a right side view including a part of the electric two-wheeled vehicle 1 shown in FIG. 1 in section. As shown in FIGS. 1 and 2, a battery case 14 accommodating a plurality of batteries 13 is arranged between the pair of right and left main frames 7, and this battery case 14 is fixed to the main frames 7. The battery case 14 has a substantially rectangular parallelepiped outline, and is arranged to overlap the main frames 7 in side view. More specifically, a center position of the battery case 14 is located slightly lower than a center line extending forward and rearward of the main frames 7 in a state where the battery case 14 overlaps the main frames 7 in side view. Thus, the heavy batteries 13 can be arranged much lower, and the plurality of batteries 13 are arranged near the main frames 7 in a concentrative manner in side view, and therefore mechanical cornering performance is improved without diminishing straight-running stability of the electric two-wheeled vehicle 1.

A motor case 16 accommodating the motor 15 for traveling power is arranged behind and below the battery case 14 and in front of the pivot frames 8, and this motor case 16 is fixed to the main frames 7 and the pivot frames 8. The motor 15 has a magnet coil as an electric part producing heat during operation as publicly known. The motor case 16 includes a case body 16a having a substantially cylindrical outline, and a plurality of radiation fins 16b projecting on an outer surface (upper surface in this example) of the case body 16a. The motor case 16 accommodates the motor 15 such that an output shaft 15a of the motor 15 faces a vehicle width direction. A left end portion (not shown) of the output shaft 36 protrudes outside the motor case 16, and a chain 17 driving the rear wheel 10 is wound around a sprocket (not shown) provided on the left end portion.

An electronic device case 20 accommodating a controller 18 and an inverter 19 and the like is arranged behind the battery case 14, above the motor case 16, and in front of the pivot frames 8. The controller 18 and the inverter 19 have electric parts producing heat as publicly known. The electronic device case 20 includes a case body 20a having a substantially rectangular parallelepiped outline, and a plurality of radiation fins 20b projecting on an outer surface (lower surface in this example) of the case body 20a. The inverter 19 converts DC power stored in the batteries 13 to AC power to supply the same to the motor 15. The controller 18 instructs the inverter 19 to control power supplied from the batteries 13 to the motor 15, thereby controlling operation of the motor 15. The batteries 13, the inverter 19, the motor 15, the controller 18 and the like are connected to each other by electric wires (not shown).

A duct 21 taking in traveling wind from the front is provided near the head pipe 6. The duct 21 has a flow path 21a extending in a forward and rearward direction, and the head pipe 6 airtightly penetrates the duct 21 vertically in the middle of the flow path 21a. A traveling wind inlet 21b opening forward is provided on a front end portion of the duct 21. This traveling wind inlet 21b is located in front of the head pipe 6, and no wall blocking flow of traveling wind exists in front of the traveling wind inlet 21b. The traveling wind outflow port 21c on the rear end portion of the duct 21 is communicated with a traveling wind inflow port 14b on a front portion of the battery case 14. The flow path 21a of the duct 21 is arranged with a butterfly valve 22 adjusting an opening degree of the flow path 21a, and a valve actuator 27 (see FIG. 4) drives opening/closing of the valve 22.

The plurality of batteries 13 are arranged with clearances therebetween in an inner space 14a of the battery case 14. A drain pipe 14c is connected to a lowermost portion in a gravity direction at a rear lower portion of the battery case 14, and moisture attached to an inner wall surface of the battery case 14 can be discharged outside from the drain outlet 14d of the drain pipe 14c by its own weight. A plurality of traveling wind ejection nozzles 14e, 14f which are pores opening rearward are formed as traveling wind outlets on a rear end portion surface 14g of the battery case 14. The lower traveling wind ejection nozzles 14e are arranged such that flow path axial lines thereof pass radiation fins 16b of the motor case 16 (or, passes a space between the adjacent radiation fins 16b). The upper traveling wind ejection nozzles 14f are arranged such that flow path axial lines thereof touch radiation fins 20b of the electronic device case 20 (or, pass a space between the adjacent radiation fins 20b).

In the electric two-wheeled vehicle 1 of the present embodiment, the duct 21 and the battery case 14 configure a traveling wind guide body 30, and the flow path 21a of the duct 21 and the inner space 14a of the battery case 14 configure a traveling wind path 30a. That is, the traveling wind guide body 30 has the traveling wind inlet 21b taking in traveling wind from front, the traveling wind path 30a through which the traveling wind taken in by the traveling wind inlet 21b flows, and the plurality of traveling wind ejection nozzles 14e, 14f ejecting the traveling wind flowing through the traveling wind path 30a toward the motor case 16 and the electronic device case 20. A total flow path sectional area of the plurality of traveling wind ejection nozzles 14e, 14f is smaller than that of the traveling wind inlet 21b of the traveling wind guide body 30, and a flow rate of air ejected from the traveling wind ejection nozzles 14e, 14f is increased.

Figure 3:
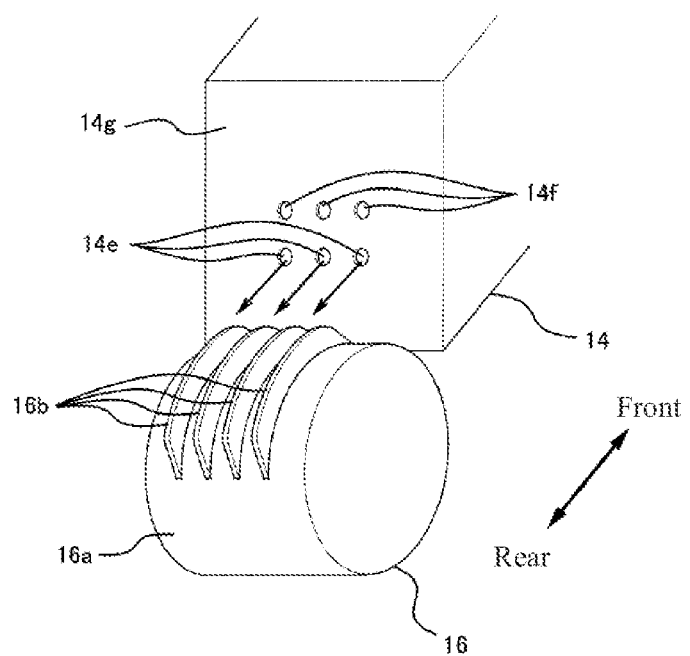
FIG. 3 is a perspective view as viewed from diagonally behind a main portion of the electric two-wheeled vehicle shown in FIG. 1.

FIG. 3 is a perspective view as viewed from diagonally behind a main portion of the electric two-wheeled vehicle 1 shown in FIG. 1. As shown in FIG. 3, the plurality of radiation fins 16b of the motor case 16 protrude upward from an outer surface of the case body 16a to extend along the forward and rearward direction. During traveling of the electric two-wheeled vehicle 1, traveling wind from the front is taken in the traveling wind path 30a by the traveling wind inlet 21b, and the traveling wind is ejected by the traveling wind ejection nozzles 14e of the traveling wind guide body 30 at high speed. The ejected traveling wind jet flows along an extending direction of the radiation fins 16b while directly touching the radiation fins 16b to exchange heat with the radiation fins 16b.

Thus, during traveling of the electric two-wheeled vehicle 1, the motor case 16 is cooled by traveling wind increased in speed by the traveling wind ejection nozzles 14e, and therefore the motor 15 can be effectively cooled without a cooling fan or the like. Furthermore, the radiation fins 16b increase a heat dissipation area of the motor case 16, and are cooled by the traveling wind increased in speed by the traveling wind ejection nozzles 14e, and hence cooling effects are synergistically enhanced. The radiation fins 16b are arranged to extend along a flow direction of the traveling wind jet ejected from the traveling wind ejection nozzles 14e, thereby enabling suppression of noises due to collision of the traveling wind jet and the radiation fins 16b.

Additionally, traveling wind jet ejected from the upper traveling wind ejection nozzles 14f at high speed similarly directly touches the radiation fins 20b of the electronic device case 20 to exchange heat, and effectively cools the electronic device case 20. The traveling wind ejection nozzles 14e, 14f are not limited to holes and may have a cylindrical shape with a tip narrowed rearward, for example.

Figure 4:
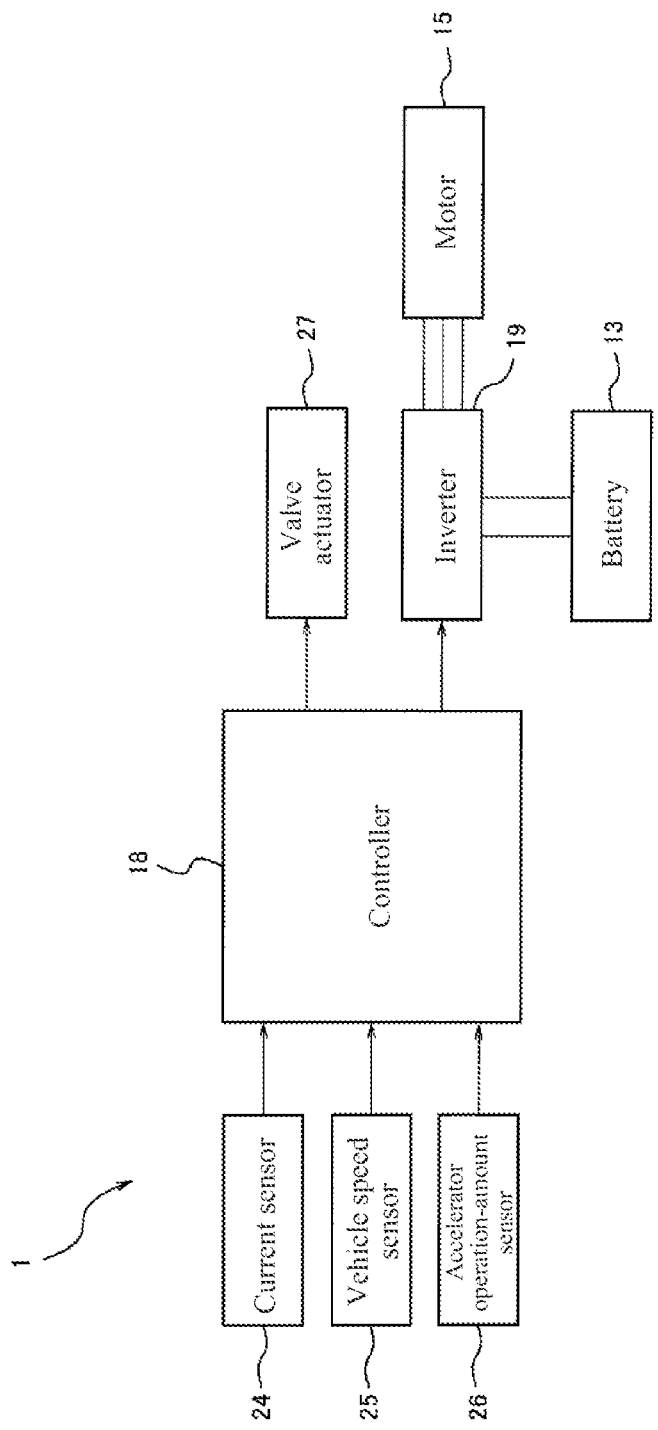
FIG. 4 is a block diagram of a control system of the electric two-wheeled vehicle shown in FIG. 1.

FIG. 4 is a block diagram of a control system of the electric two-wheeled vehicle 1 shown in FIG. 1. As shown in FIGS. 2 and 4, the controller 18 is connected to a current sensor 24 capable of detecting a value of a current flowing through the magnet coil (not shown) of the motor 15, a vehicle speed sensor 25 capable of detecting traveling speed of the electric two-wheeled vehicle 1 by detecting the rotation number of the front wheel 3, and an accelerator operation-amount sensor 26 capable of detecting an accelerator operation-amount that is a rotation amount of the accelerator grip 4a operated by the driver, as a detector.

The controller 18 controls the inverter 19 according to the accelerator operation-amount detected by the accelerator operation-amount sensor 26, thereby controlling a current supplied from the batteries 13 to the motor 15, and adjusting output of the motor 15. That is, the controller 18 is configured such that the output of the motor 15 increases with increase of the accelerator operation-amount. Thus, drive force of the rear wheel 10 increases according to a driver's acceleration demand by operation of the accelerator grip 4a.

In a case where a current value detected by the current sensor 24 is a predetermined value or more, the controller 18 controls the valve actuator 27 such that an opening degree of the valve 22 is larger compared to a case where the current value detected by the current sensor 24 is less than the predetermined value. Consequently, when the current value detected by the current sensor 24 increases, and heat values of the batteries 13, the motor 15 and the like increase, the opening degree of the valve 22 increases and a flow rate of the traveling wind flowing through the traveling wind path 30a of the traveling wind guide body 30 increases. Accordingly, when the heat values are large, the batteries 13, the motor 15, and the inverter 19 can be sufficiently cooled, and a temperature can be previously suitably kept before excessively increasing.

In a case where traveling speed detected by the vehicle speed sensor 25 is a predetermined value or more, the controller 18 may control the valve actuator 27 such that an opening degree of the valve 22 is larger compared to a case where the traveling speed detected by the vehicle speed sensor 25 is less than the predetermined value. That is, it is estimated that output of the motor 15 is large when the traveling speed is large, and therefore the opening degree of the valve 22 is increased, thereby increasing the flow rate of the traveling wind flowing through the traveling wind path 30a of the traveling wind guide body 30. Accordingly, when the heat values are large, the batteries 13, the motor 15, and the like can be sufficiently cooled, and a temperature can be previously suitably kept before excessively increasing. The valve control by a detection value of the vehicle speed sensor 25 and the aforementioned valve control by the current sensor 24 may be performed selectively or in parallel.

In a case where the current value detected by the current sensor 24 is the predetermined value or more, the controller 18 may control the valve actuator 27 such that an opening degree of the valve 22 is smaller compared to a case where the current value detected by the current sensor 24 is less than the predetermined value. For example, in a cold area where a temperature sensor (not shown) detects that ambient temperature is lower than a predetermined value (e.g., 0° C.), when the output of the motor 15 increases and the traveling speed increases, increase of the flow rate of the traveling wind flowing in the traveling wind guide body 30 is suppressed, and hence the batteries 13 and the motor 15 can be prevented from being excessively cooled by traveling wind.

Second Embodiment

Figure 5:
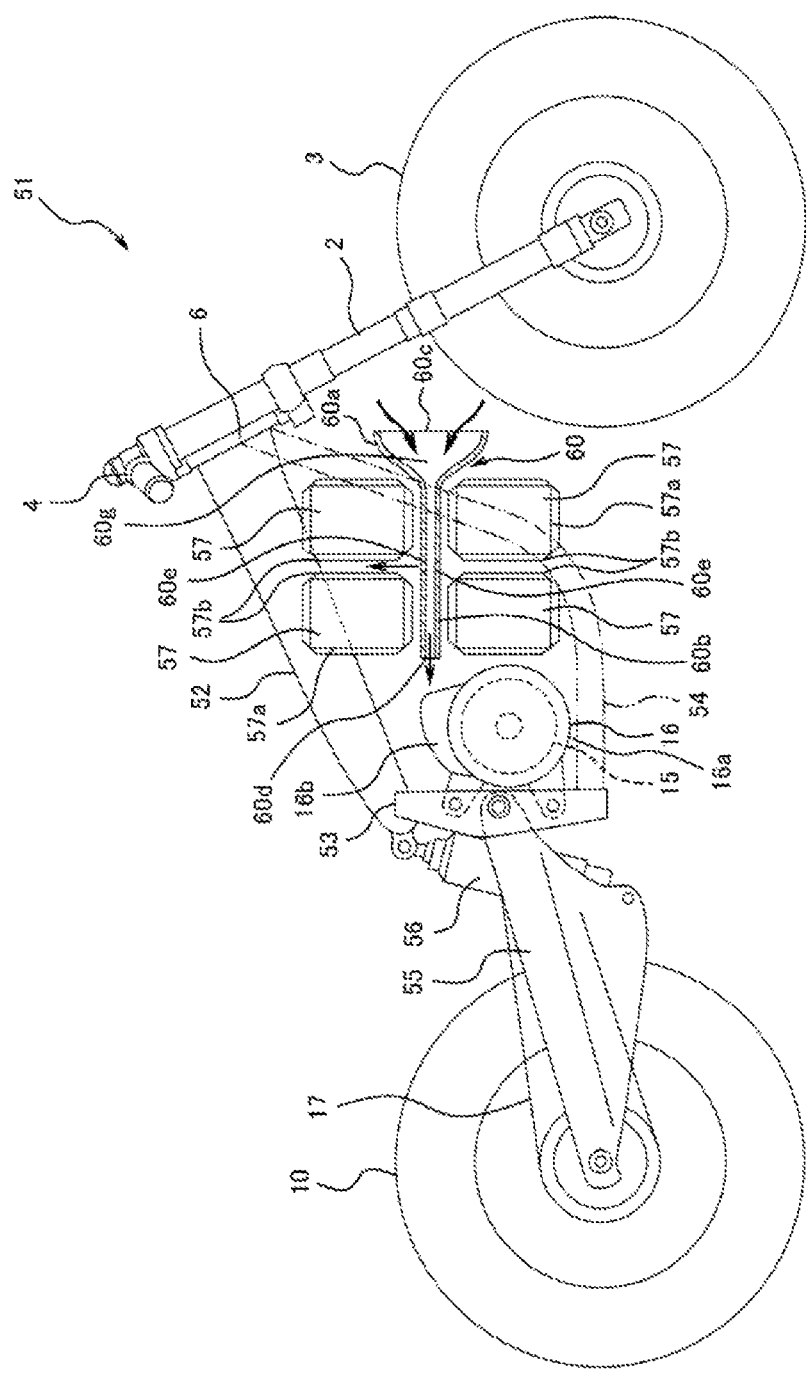
FIG. 5 is a right side view including a part of an electric two-wheeled vehicle of a second embodiment of the present invention in section.

FIG. 5 is a right side view including a part of an electric two-wheeled vehicle 51 of a second embodiment of the present invention in section. In the present embodiment, a seat for a driver and the like are omitted in the drawings. In the description, configurations in common with the first embodiment are omitted by denoting the same reference numerals. As shown in FIG. 5, a body frame of the electric two-wheeled vehicle 51 includes a single main frame 52 extending rearward while slightly inclining downward from a head pipe 6, a pair of right and left down frames 54 extending downward from the head pipe 6, and a rectangular frame-shaped pivot frame 53 connected to rear end portions of the main frame 52 and the down frames 54. The pivot frame 53 is supported by a front end portion of a swing arm 55 supporting a rear wheel 10. A suspension 56 is interposed between an intermediate portion of the swing arm 55 and the rear end portions of the main frame 52.

A motor case 16 accommodating the motor 15 for traveling power is arranged in front of the pivot frame 53, and this motor case 16 is fixed to the pivot frame 53. The motor case 16 includes a case body 16a having a substantially cylindrical outline, and a plurality of radiation fins 16b projecting on an outer surface (upper surface in this example) of the case body 16a. These radiation fins 16b extend along the forward and rearward direction, and are formed such that protruding amounts of front portions thereof are larger than those of rear portions thereof.

A plurality of batteries 57 storing power supplied to the motor 15 are arranged in front of the motor case 16, and fixed to the main frame 52 or the down frames 54 through a bracket (not shown). The batteries 57 are provided with case 57a individually, and the case 57a are formed with a plurality of radiation fins 57b protruding outward. The plurality of batteries 57 are arranged on the top, bottom, front, rear, right, and left with clearances therebetween, and a total of eight batteries are provided in this example (only four batteries on the right are shown in FIG. 5).

A cylindrical traveling wind guide body 60 formed with a traveling wind path 60g therein is arranged in a clearance between the upper and lower batteries 57. The traveling wind guide body 60 of the present embodiment is integrally molded with and fixed to the down frames 54. The traveling wind guide body 60 includes a large-diameter portion 60a formed with a traveling wind inlet 60c opening forward, and a small-diameter portion 60b continuous to the large-diameter portion 60a and extending rearward. The large-diameter portion 60a is located in front of the batteries 57, and a flow path sectional area gradually expands from the small-diameter portion 60b to the traveling wind inlet 60c. The small-diameter portion 60b extends rearward between the upper and lower batteries 57, and is formed with a traveling wind ejection nozzle 60d opening toward the radiation fins 16b of the motor case 16 on its rear end portion. The traveling wind guide body 60 is also formed with a traveling wind ejection nozzle 60d ejecting traveling wind in clearances between the adjacent batteries 57. In the present embodiment, traveling wind ejection nozzles 60e are formed on opposing portions of clearances between the batteries 57 arranged on the front and rear in the small-diameter portion 60b. A total flow path sectional area of the plurality of traveling wind ejection nozzles 60d, 60e is smaller than that of the traveling wind inlet 60c of the traveling wind guide body 60.

During traveling of the electric two-wheeled vehicle 1, traveling wind from the front is taken in the traveling wind path 60g by the traveling wind inlet 60c, and the traveling wind is ejected by the traveling wind ejection nozzles 60d, 60e of the traveling wind guide body 60 at high speed. The ejected traveling wind jet directly touches the radiation fins 16b, 57b to cool the radiation fins 16b, 57b. That is, the traveling wind jet also blows the radiation fins 57b provided on opposing outer surfaces of the case of the batteries 57 arranged on the front and rear. Thus, the traveling wind increased in speed effectively cools the motor 15 and the batteries 57. Additionally, in order for the traveling wind jet to touch radiation fins of a case surrounding a controller and an inverter (not shown), a nozzle may be added separately, or a single nozzle may be branched to cool the controller and the inverter.

Third Embodiment

Figure 6:
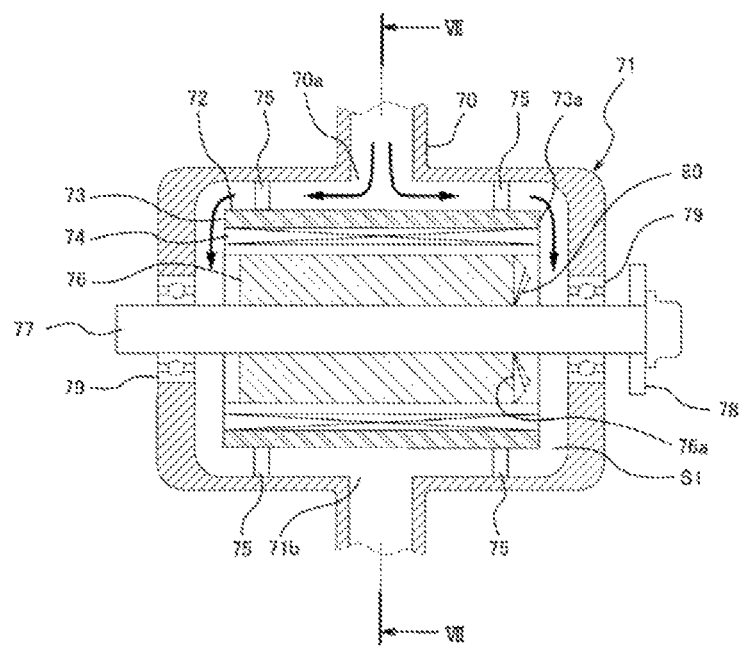
FIG. 6 is a sectional view of a main portion of an electric two-wheeled vehicle of a third embodiment of the present invention.
Figure 7:
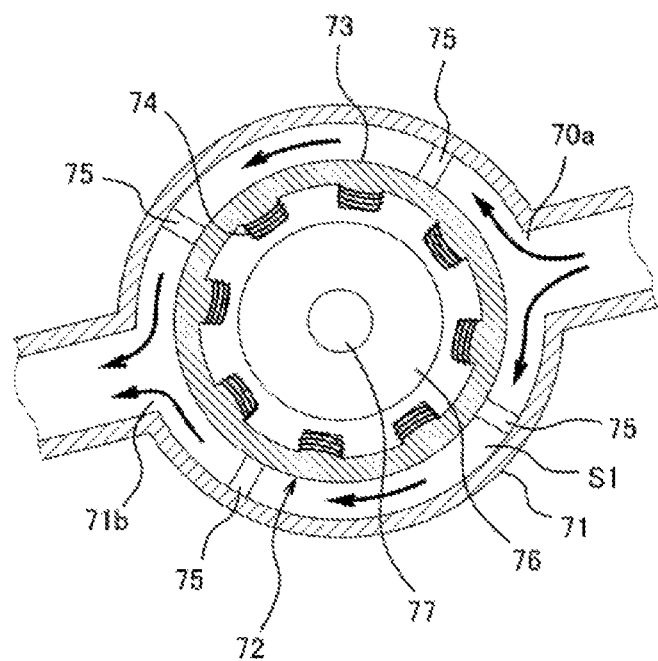
FIG. 7 is a sectional view taken along a IIV-IIV line of FIG. 6.

FIG. 6 is a sectional view of a main portion of an electric two-wheeled vehicle of a third embodiment of the present invention. FIG. 7 is a sectional view taken along a IIV-IIV line of FIG. 6. As shown in FIGS. 6 and 7, in the present embodiment, a motor case 71 accommodating a motor 72 for traveling power is communicated with a battery case 14 (see FIG. 1) through a traveling wind duct 70. That is, traveling wind introduced from a traveling wind inlet 21b (see FIG. 1) to a traveling wind duct 21 (see FIG. 1) flows through the traveling wind duct 70 after passing inside a battery case 14 (see FIG. 1), and is ejected from a traveling wind outlet 70a toward the motor 72 inside the motor case 71. A flow path sectional area of the traveling wind outlet 70a is smaller than that of the traveling wind inlet 21b (see FIG. 1).

The motor 72 includes a stator 73 having coils 74, and a rotor 76 arranged on an inner peripheral side of the stator 73 and having a magnet, a rotary axis 77 of the rotor 76 is rotatably supported on the motor case 71 through bearings 79, and the rotary axis 77 is provided with a sprocket 78 around which a chain 17 (see FIG. 1) is wound. An outer peripheral surface of the stator 73 is separated from an inner peripheral surface of the motor case 71 with a clearance S1 therebetween, and spacers 75 are partially interposed between the motor case 71 and the stator 73. Traveling wind ejected from the traveling wind outlet 70a of the traveling wind duct 70 toward the stator 73 flows through the clearance S1 to cool the whole of the stator 73 and is discharged from an outlet 71b of the motor case 71. Thus, deterioration of a magnetic field of the stator 73 produced by shrinkage fit and having internal stress can be suppressed by cooling the stator 73 with the traveling wind.

An end surface 76a in a rotation axis direction in the rotor 76 is exposed from the stator 73. Blades 80 are provided on the end surface 76a of the rotor 76. Consequently, when the rotor 76 rotates, the blades 80 agitate air in the clearance S1, and cooling performance is improved. The end surface 73a of the stator 73 extends further outward in the rotation axis direction than the end surface 76a of the rotor 76, and the blades 80 are arranged to be evacuated further inward in the rotation axis direction than the end surface 73a of the stator 73. Consequently, the blades 80 do not block flow of the traveling wind flowing through the clearance S, and smooth cooling can be achieved. Since other configurations are similar to those of the aforementioned first embodiment, description thereof will be omitted.

Fourth Embodiment

Figure 8:
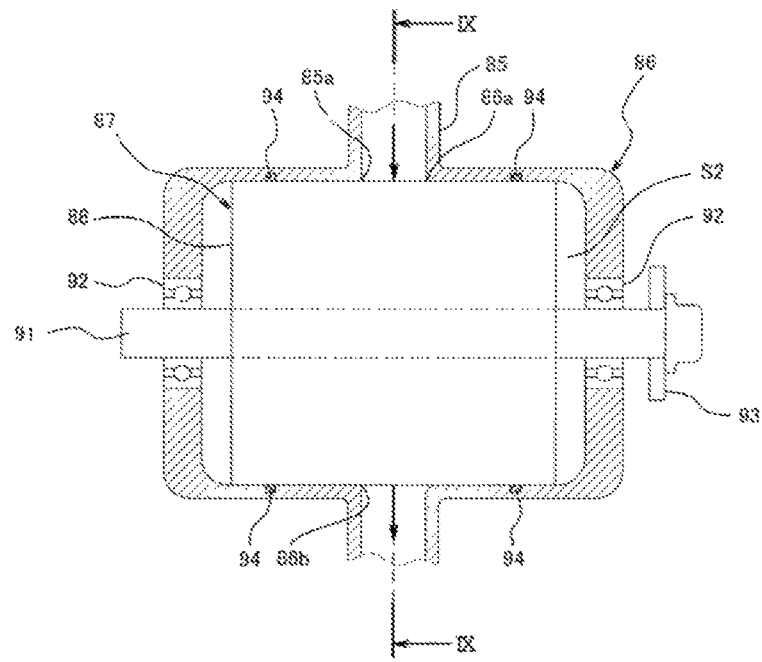
FIG. 8 is a sectional view of a main portion of an electric two-wheeled vehicle of a fourth embodiment of the present invention.
Figure 9:
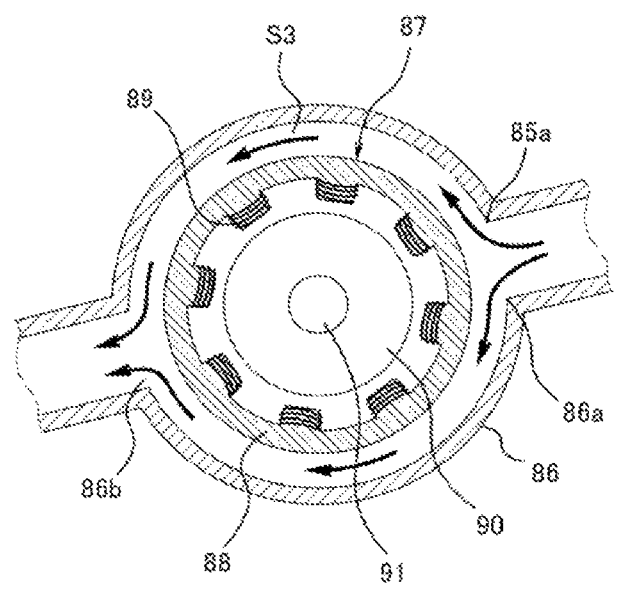
FIG. 9 is a sectional view taken along a IX-IX line of FIG. 8.

FIG. 8 is a sectional view of a main portion of an electric two-wheeled vehicle of a fourth embodiment of the present invention. FIG. 9 is a sectional view taken along a IX-IX line of FIG. 8. As shown in FIGS. 8 and 9, in the present embodiment, a motor case 86 accommodating a motor 87 for traveling power is communicated with a battery case 14 (see FIG. 1) through a traveling wind duct 85. That is, traveling wind introduced from a traveling wind inlet 21*b* (see FIG. 1) to a traveling wind duct 21 (see FIG. 1) flows through the traveling wind duct 85 after passing inside the battery case 14 (see FIG. 1), and is ejected from a traveling wind outlet 85*a* toward the motor 87 inside the motor case 86. A flow path sectional area of the traveling wind outlet 85*a* is smaller than that of the traveling wind inlet 21*b* (see FIG. 1).

The motor 87 includes a stator 88 having coils 89, and a rotor 90 arranged on an inner peripheral side of the stator 88 and having a magnet, a rotary axis 91 of the rotor 90 is rotatably supported on the motor case 86 through bearings 92, and the rotary axis 91 is provided with a sprocket 93 around which a chain 17 (see FIG. 1) is wound. The stator 88 airtightly fits the motor case 86 through O-rings 94 on both sides in a rotation axis direction.

An end surface in the rotation axis direction of the stator 88 is separated from an inner wall surface of the motor case 86 with a clearance S2 therebetween. On the other hand, an outer peripheral surface of the stator 88 is separated from an inner peripheral surface of the motor case 86 with a clearance S3 therebetween in a region between O-rings 94 on the both sides (see FIG. 9). That is, the clearances S2 and S3 are isolated by the O-rings 94 and not communicated with each other, and oil lubricating the bearings 92 does not enter the clearance S3. Traveling wind ejected from the traveling wind outlet 85*a* of the traveling wind duct 85 toward the stator 88 flows through the clearance S3 to cool the stator 88, and traveling wind flowing along the stator 88 is discharged from an outlet 86*b* of the motor case 86. Since other configurations are similar to those of the aforementioned first embodiment, description thereof will be omitted.

The present invention is not limited to the aforementioned respective embodiments, and configurations thereof can be modified, added or deleted without departing from the gist of the invention. The aforementioned respective embodiments may be voluntarily combined, and for example, a part of a configuration or a method in one embodiment may be applied to other embodiment.

INDUSTRIAL APPLICABILITY

As described above, the saddle-type vehicle according to the present invention has an excellent effect of enabling effective cooling of an electric component with a simple configuration, and is useful when widely applied to electric two-wheeled vehicles or ATVs (All Terrain Vehicle) capable of exerting significance of this effect.

DESCRIPTION OF REFERENCE CHARACTERS 1, 51: ELECTRIC TWO-WHEELED VEHICLE
5: BODY FRAME
6: HEAD PIPE
13: BATTERY
14, 57: BATTERY CASE
14*a*: INNER SPACE
14*e*, 14*f*, 60*d*, 60*e*: TRAVELING WIND OUTLET (TRAVELING WIND EJECTION NOZZLE)
15: MOTOR
16: MOTOR CASE
16*b*, 20*b*, 57*b*: RADIATION FINS
18: CONTROLLER
19: INVERTER
21: DUCT
21*b*: TRAVELING WIND INLET
22: VALVE
24: CURRENT SENSOR
25: VEHICLE SPEED SENSOR
26: ACCELERATOR OPERATION-AMOUNT SENSOR
27: VALVE ACTUATOR
30, 60: TRAVELING WIND GUIDE BODY
30*a*, 60*g*: TRAVELING WIND PATH

The invention claimed is:

1. A saddle-type vehicle comprising:
   a first electric component having an electric part producing heat during operation;
   a second electric component having an electric part producing heat during operation;
   a third electric component having an electric part producing heat during operation; and
   a traveling wind guide body for cooling the first, second and third electric components by traveling wind,
   wherein the traveling wind guide body has a traveling wind inlet taking in traveling wind from front, a traveling wind path through which the traveling wind taken in by the traveling wind inlet flows, a first traveling wind outlet ejecting the traveling wind from the traveling wind path towards the second electric component via an open space between the first traveling wind outlet and the second electric component in order to cool the second electric component and a second traveling wind outlet ejecting the traveling wind from the traveling wind path towards the third electric component via an open space between the second traveling wind outlet and the third electric component in order to cool the third electric component, and each of flow path sectional areas of the first and second traveling wind outlets is smaller than that of the traveling wind inlet,
   the first electric component is accommodated in the traveling wind guide body, and
   the traveling wind which is ejected from the first traveling wind outlet and the traveling wind which is ejected from the second traveling wind outlet respectively cool the second electric component and the third electric component in parallel.

2. The saddle-type vehicle according to claim 1, wherein at least one of the second electric component and the third electric component is accommodated in a case,
   the case has a radiation fin, and
   the first and second traveling wind outlets eject the traveling wind flowing through the traveling wind path toward the radiation fin.

3. The saddle-type vehicle according to claim 1, the saddle-type vehicle being an electric vehicle,
   wherein the first electric component includes a battery supplying electric power to the motor,
   the second electric component includes a motor generating traveling power transmitted to a drive wheel, and
   the third component includes an inverter interposed between the battery and the motor.

4. The saddle-type vehicle according to claim 1, comprising:
a valve capable of opening/closing the traveling wind path;
a valve actuator driving the valve;
a detector for detecting a parameter value associated with output of a motor generating traveling power transmitted to a drive wheel; and
a controller controlling the valve actuator according to the parameter value detected by the detector.

5. The saddle-type vehicle according to claim 4, wherein the detector is a current sensor detecting a value of a current flowing through a coil of the motor, a vehicle speed sensor detecting vehicle traveling speed, or an accelerator operation-amount sensor detecting an accelerator operation-amount by a driver.

6. The saddle-type vehicle according to claim 4, wherein in a case where the parameter value is such a value that output of the motor increases, the controller controls the valve actuator such that an opening degree of the valve becomes larger compared to a case where the parameter value is such a value that the output of the motor reduces.

7. The saddle-type vehicle according to claim 1, the saddle-type vehicle being an electric two-wheeled vehicle, comprising:
a body frame having a head pipe supporting a steering shaft, and a frame portion extending substantially rearward from the head pipe,
wherein the traveling wind guide body forms a part of the frame portion and extends such that a rear part is at a lower position.

8. The saddle-type vehicle according to claim 2,
wherein the radiation fin projects from an outer surface of the case, and
the radiation fin is arranged to extend along a flow direction of the traveling wind jet ejected from the traveling wind ejection outlet.

9. The saddle-type vehicle according to claim 8, wherein the traveling wind outlets are nozzles formed on the traveling wind guide body.

10. The saddle-type vehicle according to claim 8, wherein the traveling wind guide body includes a battery case, and the traveling wind outlets are formed on the battery case.

11. The saddle-type vehicle according to claim 1, wherein the open spaces are exposed to an outside of a vehicle.

12. The saddle-type vehicle according to claim 1, wherein the second and third electric components are respectively accommodated in cases,
the cases have radiation fins projecting on outer surfaces of the cases respectively, and
the first and second traveling wind outlets eject the traveling winds flowing toward the radiation fins respectively.

13. The saddle-type vehicle according to claim 12, wherein each of the radiation fins projects on an upper surface or lower surface of each of the cases.

14. The saddle-type vehicle according to claim 1, further comprising:
a body frame having a head pipe supporting a steering shaft, and a frame portion extending substantially rearward from the head pipe,
wherein the traveling wind guide body includes a duct taking in the traveling wind, the duct being located in a vicinity of the head pipe.

15. The saddle-type vehicle according to claim 1, further comprising:
a body frame having a head pipe supporting a steering shaft, and a frame portion extending substantially rearward from the head pipe,
wherein a traveling wind inlet which opens forward is provided on the traveling wind guide body, the traveling wind inlet being located in front of the head pipe.

16. A saddle-type vehicle comprising:
a motor accommodated in a motor case which has a radiation fin projecting on an outer surface of the motor case;
an electronic device accommodated in an electronic device case which has a radiation fin projecting on an outer surface of the electronic device case; and
a traveling wind guide body for cooling the electric component by traveling wind,
wherein the traveling wind guide body has a traveling wind inlet taking in traveling wind from front, a traveling wind path through which the traveling wind taken in by the traveling wind inlet flows, and a first traveling wind outlet ejecting the traveling wind flowing from the traveling wind path towards an outer surface of the case in order to cool the motor and a second traveling wind outlet ejecting the traveling wind from the traveling wind path towards the electric device in order to cool the electronic device, and each of flow path sectional areas of the first and second traveling wind outlets is smaller than that of the traveling wind inlet,
the first traveling wind outlet is arranged such that a flow path axial line of the first traveling wind outlet touches the radiation fin of the motor case, and the second traveling wind outlet is arranged such that a flow path axial line of the second traveling wind outlet touches the radiation fin of the electronic device case.

17. The saddle-type vehicle according to claim 16, where the motor and the electronic devices are arranged so as to face each other in a vertical direction;
the radiation fins of the motor case and electronic device case are located between the motor and electronic devices; and
the first and second traveling wind outlets are located in front of the radiation fins.

* * * * *